Sept. 26, 1967    H. S. VAN BUREN, JR    3,343,441
SELF-SECURING FASTENER
Filed April 1, 1965

Inventor:
Harold S. van Buren Jr.,
by Philip E. Parker
Atty.

United States Patent Office 3,343,441
Patented Sept. 26, 1967

3,343,441
SELF-SECURING FASTENER
Harold S. van Buren, Jr., Cambridge, Mass., assignor to United-Carr Incorporated, Cambridge, Mass., a corporation of Delaware
Filed Apr. 1, 1965, Ser. No. 444,741
7 Claims. (Cl. 85—70)

The present invention relates generally to fasteners and more particularly to a "blind" fastener adapted to co-operate with a screw in securing articles apertured supports of varying thicknesses.

While it is envisioned that the invention might be employed in a myriad of diverse applications, it is best understood by considering it in the light of the principal motivating force attendant to its discovery; namely, the development of a fastener for securing articles such as shelves, freezer units, egg dishes, and butter dishes, etc., to the now widely used plastic liners in refrigerators.

Thus the design criteria and objects of the present invention were to provide a unitary device (a) Which is adapted for "blind" insertion in an apertured support; for example, a plastic refrigerator liner subsequent to the installation of the liner in a box;

(b) Which is adapted to accommodate a wide range of support thicknesses (a condition which is often prevalent in molded plastic liners);

(c) Which will effectively seal around a screw used in conjunction therewith to secure articles of the type mentioned above to a support (liner); and, most importantly (d) Which engages a support in such a manner as to eliminate the cracking and fracturing of the support at the edges of an aperture therein which often occurred in the past.

The devices shown in U. S. Patents 2,657,894 (L. J. Sklenar) and 2,788,047 (G. M. Rapata) are examples of the prior art which led to such a condition due to the manner in which the expanded portions of their respective shanks are forced against the internal edges defining the aperture in a support (liner).

Figure 1:
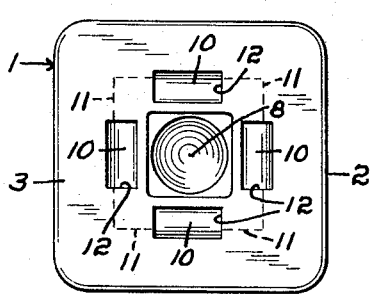
Figure 2:
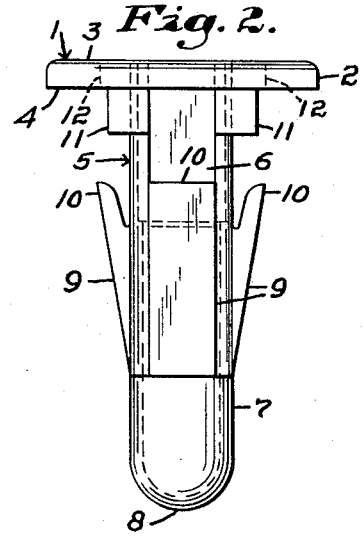
Figure 3:
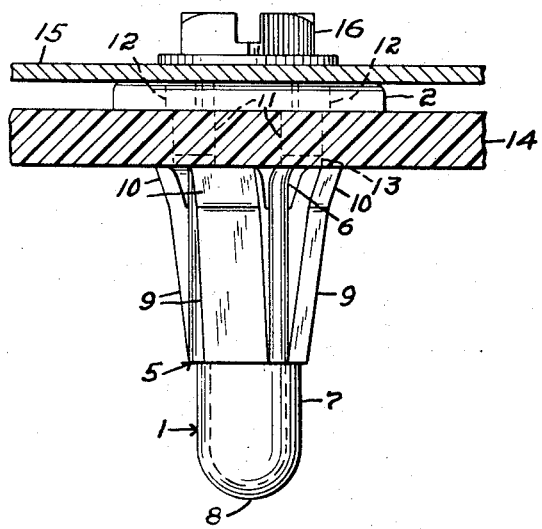
Figure 4:
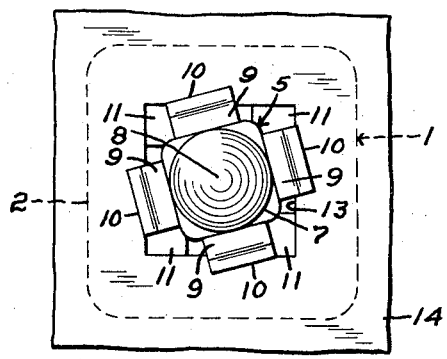
Figure 6:
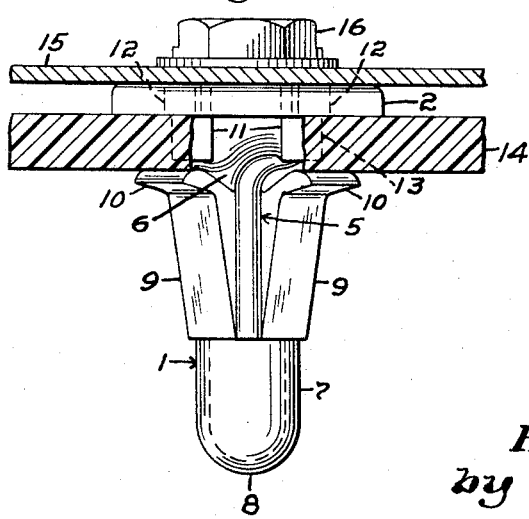
Figure 5:
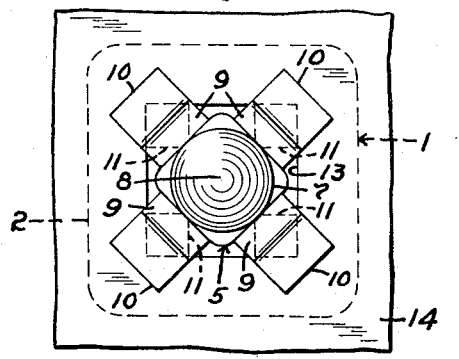

Other objects and advantages of the novel fastener will become apparent from a reading of the following detailed description in conjunction with a viewing of the accompanying drawings in which:

FIG. 1 is a top plan view of the fastener;
FIG. 2 is a side elevation of the fastener;
FIG. 3 is a side elevation of an installation depicting the fastener securing an article to an apertured support wherein a screw is partially torqued into the fastener, the article and the support being shown in section;
FIG. 4 is a bottom plan view of the installation shown in FIG. 3;
FIG. 5 is a bottom plan view of an installation similar to FIG. 3 wherein the screw is fully seated in the fastener; and
FIG. 6 is a side elevation of the installation of FIG. 5 with the article and the support being shown in section and the support being partially broken away.

The fastener 1 is formed of a molded, resilient plastic material and includes a head 2 having flat sides 3 and 4 and a hollow shank 5 extending from the head 2. The upper portion 6 of the shank 5 has a generally rectangular configuration and its lower portion 7 is generally tubular. The end 8 of the shank remote from the head 2 is closed. As best shown in FIGS. 1 and 2 the tubular portion 7 of the shank 5 has an internal diameter which is less than the internal width of the upper portion 6.

A plurality of fins 9 are disposed about the outer periphery of the shank 5. The fins 9 have a wedge-like configuration and have a free upper end 10 spaced from the upper portion 6 of the shank and extending towards the head 2 at an acute angle to the shank. It should also be noted that the fins 9 are spaced from one another and the distance between the fins is greater at the upper free ends 10 than at the ends closest to the closed end 8 of the shank.

A plurality of posts 11 each having the general configuration of a portion of a rectangular parallelepiped are molded to the upper portion 6 of the shank 5 adjacent the underside 4 of the head 2.

The head 2 is also shown to have a plurality of slots 12 formed therein adjacent the upper portion 6 of the shank. These slots result from the blades employed in the mold cavity to form the spaced free ends 10 of the fins 9 and do not bear directly on the novelty or utility of the invention.

The installation of FIGS. 3-6 is accomplished by inserting the fastener 1 into a rectangular aperture 13 in the frangible, plastic support 14 such that the posts 11 engage the corners of the internal walls of the support which define the aperture 13. The upper portions 10 of the fins 9 will flex inwardly towards the shank 5 as they pass through the support and thereafter return to their original attitude when they have cleared the underside of the support. The flat undersurface 4 of the head 2 overlies the upper surface of the support 14 adjacent the aperture 13.

An article 15 to be secured is then placed against the upper side 3 of the head 2 and a self-threading screw 16 is passed through an opening in the article and torqued into the hollow shank 5. As the screw 16 is rotated, its threads cut into the smaller diameter of the internal wall of the shank 5, which begins approximately at the upper line of jointure of the fins 9 with the shank 5, and this action causes the shank and fins to twist about the upper portion 6 of the shank which portion 6 is appreciably thinner in cross section than the remainder of the shank. Simultaneously, the fins are drawn upwardly and their free ends 10 engage the underside of the support 14 and begin to flare outwardly away from the shank 5. FIGS. 3 and 4 depict the initial stages of the twisting of the shank and flaring of the fins. In this connection one should observe that while the upper portion 6 of the shank 5 is of smaller external dimensions than the aperture 13 in the support 14 and is therefore free to twist and collapse into the aperture 13 in response to the torquing of the screw, the head 2 remains stationary due to the locking engagement of the posts 11 with the corners defining the aperture 13.

FIGS. 5 and 6 depict the screw 16 fully torqued into the shank 5. The fins 9 have been rotated approximately 45° more or less, depending on the thickness of the support, by the rather severe twist imparted to the portions 6 of the shank and the same portion of the shank has been collapsed in accordion-like fashion to a point where the ends 10 of the fins have flared outwardly and downwardly so as to be substantially normal to the axis of the shank 5. Thus the free ends 10 of the fins engage a substantial area of the underside of the support 14 thereby securely locking the fastener 1 and the article 15. However, the reader will observe that there is no lateral force applied to the edges of the support at the aperture 13, hence the possibility of cracking or fracturing the frangible support 14 is substantially reduced. In addition the portion of the screw seated within the shank 5 is completely encapsulated and sealed therein.

It is also evisioned, although not shown in the drawings, that a soft plastic filler such as polyvinyl chloride might be bonded to the internal edges of the head and the upper portion 6 of the shank which define the slots 12 in order to seal off the latter, thereby insuring a positively sealed installation as viewed in FIGS. 3-6.

From the foregoing description the reader will appreciate that the combination of the twisting and collapsing shank and the laterally flaring fins, both of which are directly controlled by the distance into the shank to which the screw is driven, will allow a single size fastener and screw combination to accommodate a wide range of support thicknesses. Further, it is to be understood that what has been disclosed herein represents only a single embodiment of the invention and is to be construed in an illustrative rather than a limiting sense; the scope of the invention being best defined by the following claims.

I claim:

1. A fastener adapted to cooperate with a screw in securing an article to an apertured support comprising an enlarged head, a hollow screw-receiving shank extending from said head, and a plurality of resilient fins disposed about the exterior of said shank, said fins projecting outwardly of said shank towards said head at an acute angle to said shank, whereby said fastener may be snapped into an apertured support, a section of said shank between said head and said fins having external dimensions appreciably less than the dimensions of the aperture in the support, said section being substantially thinner in cross section than the remainder of said shank, said shank having at least two spaced opposed posts adjacent said head, each of said posts including at least one angular corner facing outwardly from said shank and extending substantially parallel to the axis thereof for engaging the corners of a polygonal aperture in the support to prevent rotation of said head with respect to the support when the screw is torqued into said shank, whereby, responsibe to the torquing of a screw into said shank, a portion of said section adjacent said fins is twisted and collapsed into the aperture in the support and said fins are flared outwardly from said shank and are drawn against the surface of the support at points spaced from the edges of the aperture therein.

2. A fastener according to claim 1 wherein the end of said shank remote from said head is closed to provide a sealing means about the screw.

3. A fastener according to claim 1 wherein the end of said shank adjacent said head has a polygonal configuration and the end of said shank remote from said head has a tubular configuration.

4. A fastener according to claim 1 wherein said fins are spaced from one another and the distance between said fins is greater at their ends closest to said head than at their ends remote from said head.

5. A fastener according to claim 1 wherein each of said posts is in the form of a portion of a rectangular parallelepiped for effectively engaging the corners of a polygonal aperture in a support.

6. A fastener according to claim 1 wherein the sides of said head are flat to provide for flush engagement of said head with the surface of a support and flush engagement of an article with said head.

7. A fastener according to claim 1 wherein the engagement of said fins with the surface of a support causes said fins to flare downwardly as well as outwardly thereby rendering the fastener adaptable for use with supports of varying thicknesses.

References Cited

UNITED STATES PATENTS

| 2,884,099 | 4/1959 | Nenzell | 85—70 |
| 2,887,926 | 5/1959 | Edwards | 85—70 |
| 2,918,841 | 12/1959 | Poupitch | 85—71 |
| 3,040,401 | 6/1962 | Von Rath | 85—5 |
| 3,230,818 | 1/1966 | Siebol | 85—72 |

FOREIGN PATENTS 562,000    5/1957    Italy.

CARL W. TOMLIN, *Primary Examiner.*

R. S. BRITTS, *Assistant Examiner.*